Dec. 22, 1942. JOSEF-JOHANN GUTBROD ET AL 2,306,263
METHOD OF MANUFACTURING CONTACT PIN
Filed Feb. 27, 1941
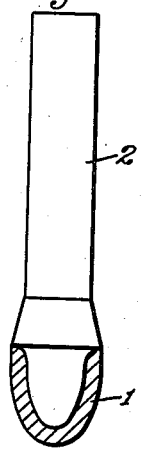
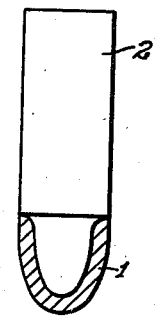
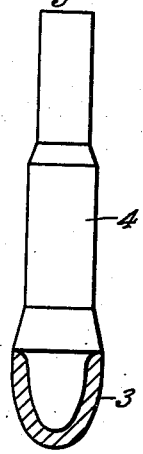
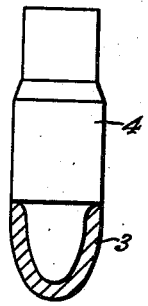
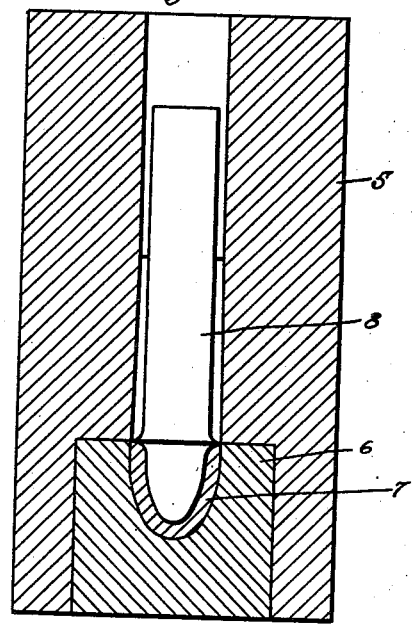
WITNESSES:
E. F. Oberheim.
James N. Ely
INVENTORS
Josef-Johann Gutbrod,
Kurt Matthies & Paul Scholz.
BY
Ezra N. Savage
ATTORNEY Patented Dec. 22, 1942

2,306,263

UNITED STATES PATENT OFFICE 2,306,263

METHOD OF MANUFACTURING CONTACT PINS

Josef-Johann Gutbrod, Berlin-Zehlendorf, and Kurt Matthies and Paul Scholz, Berlin-Siemensstadt, Germany, assignors to Westinghouse Electric & Manufacturing Company, East Pittsburgh, Pa., a corporation of Pennsylvania Application February 27, 1941, Serial No. 380,846
In Germany August 14, 1939

2 Claims. (Cl. 29—155.55)

This invention relates to a method of manufacturing metal bodies such as, for instance, contact pins consisting of a composite metal and of a highly conductive metal. Such bodies have hitherto been manufactured in the following manner: A powder consisting of a highly refractory metal was sintered in a suitable mold in order to attain a porous basic body. A highly conductive metal was then poured preferably under vacuum into the porous basic body placed in a mold, the mold being so designed that the shank consisting of highly conductive material and carrying the contact body proper was at the same time cast in the mold.

Referring to the drawing—

Fig. 1 is a side view of a composite body to which the process may be applied;

Fig. 2 is a similar view after plastic deformation of a portion of the body of Fig. 1;

Figs. 3 and 4 are views similar to Figs. 1 and 2, respectively, showing another form of composite body; and Fig. 5 is a cross section of a mold suitable for performing the process.

The composite body, i. e., the contact making part proper of the contact pin shown in Fig. 1 is designated by the numeral 1. On this contact body is placed the shank 2 produced in the mold and consisting of good conducting metals, for instance, pure copper, silver or copper base alloys, whereas the contact body 1 consists of copper or silver and tungsten or molybdenum. The manufacture of such bodies is, of course, not limited to the above-mentioned metals but various highly refractory metals may be employed in the manufacture of the porous basic body of the contact 1 as well as various metals having a lower melting point for filling up the basic body and for manufacturing the shank.

It has been found that the properties of such contact bodies which have preferably the shape of a rod may be improved to a considerable extent when treating them according to the invention. In this case the mechanical strength of the shank is particularly increased which has hitherto been attained by adding a certain amount of a precious metal, for instance, silver. It has been found that such expensive metals can be dispensed with and yet a considerable strength of the shank may be attained without great difficulties. According to the invention the part consisting of highly conducting material is given in the case of a rod-shaped contact body consisting of a composite material and of a shaft of highly conductive metal, a predetermined form within the mold by subjecting it to a high mechanical pressure, the pressure being so chosen and the mold so designed as to cause a flow of the highly conductive material forming the shank but not a flow of the composite material.

In Fig. 2 is shown the manner how the contact pin is given the desired shape. The contact pin shown in Fig. 2 may be obtained by the plastic deformation of the contact pin shown in Fig. 1. The body is placed in a mold which is so designed that the composite body 1 approximately fits in the lower end of the hollow space of the mold so as to be supported by the mold. The shank 2 is somewhat thinner than the body 1 so that it may expand in the radial direction within the mold. The entire body is then subjected to such a high pressure as to attain the shape shown in Fig. 2. In this case the composite body 1 maintains substantially its shape, since it fits in such a manner in the mold as not to experience any substantial deformation.

The Figs. 3 and 4 show a further form of a contact pin manufactured according to the method of the invention. In Fig. 3, 3 denotes the composite body, i. e., the contact proper and 4 denotes the shank of pure copper. Also this body is placed as already described above in a mold and the shank is pressed together under a high pressure. The die and the mold are so designed that the shank assumes the shape shown in Fig. 4.

Fig. 5 shows an advantageous design of the mold. The latter consists of a part 5 with an insert 6 in which the head 7 of the contact fits in an accurate manner. The part 7 has a slightly conically shaped bore in which is placed the shank 8 of smaller diameter. On the shank 8 is exerted a pressure, for instance, by means of a die (not shown), thereby shortening the shaft 8 and expanding it so as to come into frictional engagement with the wall of the bore arranged in the part 5.

The pressing of the shaft is effected preferably by means of a hydraulic press. It has been found that the strength of the body may be increased considerably when using the method according to the invention. In the case of round copper bars it is possible to increase the hardness from 35 to 90 Brinell, i. e., an increase in strength of more than 100%. The length of the bar, when being thus treated is reduced by about 35%, whereas its diameter is increased by about 15%. It has been found that the properties of the bar when subjected to a high pressure are considerably improved according to the invention. The method according to the invention is simple and may be carried out in a rapid manner. The contact pins manufactured according to the method of the invention may be particularly employed for various switching purposes and it has been found that when using contact bodies thus treated the frequency of the switching operations may be increased to a considerable extent as compared to contact bodies of unhardened shanks.

What is claimed is:

1. The method of manufacturing contact pin members comprising, forming a sintered porous body of refractory metal having a predetermined shape and size required in a contact head, impregnating the porous body with a good conducting metal and simultaneously therewith forming a shank of the good conducting metal, the shank being secured to the impregnated body, positioning the impregnated body having the shank secured thereto in a mold having a cavity of the shape and size of the impregnated body but larger than the shank, and applying pressure to the shank to compact it and effect a flow of its metal radially to the side walls of the mold cavity without distorting the shape and size of the impregnated body, the flowing of the metal of the shank effecting an increase in the strength of the shank.

2. The method of manufacturing contact pin members comprising, forming a sintered porous body of refractory metal having a predetermined shape and size required in a contact head, impregnating the porous body with a good conducting metal and simultaneously therewith forming a shank of the good conducting metal, the shank being secured to the impregnated body, positioning the impregnated body having the shank secured thereto in a mold having a cavity of the shape and size of the impregnated body but larger than the shank, and applying pressure to the shank to compact it and effect a flow of its metal radially to the side walls of the mold cavity, the pressure being sufficient to reduce the length of the shank by about 35% and simultaneously therewith increase the diameter of the shank about 15% to increase the strength of the shank without distorting the shape and size of the impregnated body.

PAUL SCHOLZ.
JOSEF-JOHANN GUTBROD.
KURT MATTHIES.